(12) United States Patent
Vedy (10) Patent No.: US 8,492,946 B2
(45) Date of Patent: Jul. 23, 2013

(54) DEVICE FOR MOUNTING A RESOLVER IN AN ELECTRIC MACHINE

(75) Inventor: Bertrand Vedy, La Tour de Peilz (CH)

(73) Assignees: Compagnie Generale des Etablissments Michelin, Clermont-Ferrand (FR); Michelin Recherche et Technique, S.A., Granges-Paccot (CH)

( * ) Notice: Subject to any disclaimer, the term of this patent is extended or adjusted under 35 U.S.C. 154(b) by 220 days.

(21) Appl. No.: 13/061,847

(22) PCT Filed: Sep. 2, 2009

(86) PCT No.: PCT/EP2009/061341
§ 371 (c)(1),
(2), (4) Date: Jun. 10, 2011

(87) PCT Pub. No.: WO2010/026159
PCT Pub. Date: Mar. 11, 2010

(65) Prior Publication Data
US 2011/0241498 A1    Oct. 6, 2011

(30) Foreign Application Priority Data
Sep. 3, 2008 (FR) ..................................... 08 55900

(51) Int. Cl.
*H02K 7/20* (2006.01)
(52) U.S. Cl.
USPC ........................................ 310/112; 310/68 B
(58) Field of Classification Search
USPC ......................................... 310/112, 91, 68 B
See application file for complete search history.

(56) References Cited

U.S. PATENT DOCUMENTS

| 3,267,399 A | 8/1966 | Spieker et al. |
| 3,939,372 A | 2/1976 | Wurst et al. .................... 310/168 |
| 4,908,347 A | 3/1990 | Denk ................................. 505/1 |
| 5,142,182 A | 8/1992 | Grant ............................. 310/270 |
| 5,554,900 A | 9/1996 | Pop, Sr. ......................... 310/156 |
| 5,936,397 A | 8/1999 | Benkert et al. ................ 324/173 |
| 6,646,571 B1 | 11/2003 | Soar et al. ........................ 341/13 |
| 6,657,356 B2 | 12/2003 | Laurent et al. ................. 310/254 |
| 2004/0090132 A1* | 5/2004 | Utsumi et al. .............. 310/68 B |
| 2004/0232873 A1 | 11/2004 | Heizmann et al. ............ 318/653 |

(Continued)

FOREIGN PATENT DOCUMENTS

| DE | 1 488 023 A1 | 5/1969 |
| DE | 1 613 298 A1 | 12/1970 |

(Continued)

*Primary Examiner* — Nguyen N Hanh
(74) *Attorney, Agent, or Firm* — Fitzpatrick, Cella, Harper & Scinto (57) ABSTRACT

An electric machine with a resolver for a system for autocontrol of the machine includes a machine stator, a machine rotor mounted for rotation in the stator, the rotor being mounted on a shaft, and a casing enclosing this assembly. The resolver includes a fixed resolver stator centered axially in a housing inside the casing and a resolver rotor mounted on the shaft of the machine rotor inside the resolver stator. The resolver stator is locked in an axially and angularly fixed position in the housing. A mounting device is included for mounting the resolver. The mounting device includes a bearing for rotational adjustment of an angular position of the resolver rotor on the shaft of the machine rotor and a device for clamping the resolver rotor and the shaft with respect to one another in a chosen angular position. The device may include a friction race.

12 Claims, 5 Drawing Sheets

U.S. PATENT DOCUMENTS

| | | |
|---|---|---|
| 2005/0206253 A1* | 9/2005 | Hertz et al. .................. 310/68 B |
| 2006/0125439 A1 | 6/2006 | Ajima et al. .................. 318/716 |
| 2006/0226719 A1 | 10/2006 | Nakanishi et al. ............... 310/68 |
| 2007/0137373 A1 | 6/2007 | Hoefer et al. .............. 74/490.04 |
| 2007/0205679 A1 | 9/2007 | Terauchi et al. ................. 310/71 |
| 2007/0210661 A1 | 9/2007 | Schmidt et al. ................. 310/90 |
| 2007/0241625 A1* | 10/2007 | Terauchi .................... 310/68 B |
| 2007/0278875 A1* | 12/2007 | Haga et al. ...................... 310/71 |
| 2008/0005888 A1 | 1/2008 | Bourqui et al. ................. 29/596 |
| 2009/0052209 A1 | 2/2009 | Kaitani et al. .................. 363/37 |

FOREIGN PATENT DOCUMENTS

| | | |
|---|---|---|
| DE | 195 46 595 A1 | 6/1997 |
| DE | 102 26 974 A1 | 1/2004 |
| DE | 103 15 754 A1 | 10/2004 |
| DE | 10 2004 038 877 | 1/2006 |
| EP | 0 874 444 A1 | 10/1998 |
| EP | 1 174 988 A1 | 1/2002 |
| EP | 1 367 698 A2 | 12/2003 |
| EP | 1 793 475 A1 | 6/2007 |
| EP | 1 796 257 A1 | 6/2007 |
| EP | 1 901 416 A2 | 3/2008 |
| GB | 2 438 411 A | 11/2007 |
| JP | 58-224546 A | 12/1983 |
| JP | 60-096147 A | 5/1985 |
| JP | 2005-318745 A | 11/2005 |
| WO | WO 03/001216 A1 | 1/2003 |
| WO | WO 2005/107042 A1 | 11/2005 |

\* cited by examiner

DEVICE FOR MOUNTING A RESOLVER IN AN ELECTRIC MACHINE

FIELD OF THE INVENTION

The present invention relates to rotating electric machines. It is aimed especially at machines capable of deploying significant powers in a very compact format, especially when they operate as a motor, for example for traction applications aboard automotive vehicles.

RELATED ART

Proposals for electric vehicles have multiplied in recent years. Electric motors have begun to appear whose power can reach for example 20 or indeed 30 kW within confines compatible with the interior of a vehicle wheel or its immediate environment in the case of a vehicle comprising an electric machine for each wheel. Having regard to the significant electrical power deployed by these machines in a restricted space, the arrangement of the functional members such as the stator, the rotor and the accessory elements necessary for controlling the machine inside the casing remains an essential concern for the designers of machines of this type.

According to a mode of construction known in the prior art, for example through patent document EP 1 174 988, an electric machine suitable for the new applications to automobiles comprises a stator housed in a quill in such a way that the terminal parts of the latter extend axially outwards beyond the ends of the stator magnetic circuit which constitutes the active part of the stator. This magnetic circuit is traversed by notches which emerge in each of its terminal faces. The notches are filled by conductors which form windings in the magnetic circuit. Where the notches exit in each axial end face of the magnetic circuit, the conductors are folded back, so forming loops to pass from one notch to the next, thus constituting winding heads which are accommodated in a terminal part of the casing. Into one of the terminal faces of the stator also emerge the ends of the winding conductors which are intended to be connected up electrically with a connector or an appropriate connection box. Electrical connection of the windings with one another and with the outside makes it possible, as the case may be, either to produce a traction torque on the rotor so as to drive the wheels of the vehicle when the circuit of these windings is wired up to a three-phase alternating power supply, or to generate three-phase electrical energy if the windings of the machine are wired up to allow it to operate as a generator in the braking phases.

On each side of the stator is provided a flange secured to the casing of the machine which carries one of the bearings of the shaft of the rotor. On one of these sides, the shaft of the rotor is extended beyond its roller bearing on the other side of the said flange. At the extremity of this extension of the rotor shaft is mounted the rotor of a resolver whose stator is fixed in a housing in the casing end. When the shaft of the electric machine rotates, it drives the rotor of the resolver which produces at the output of its stator an A.C. electrical signal whose phase characteristics faithfully and instantaneously reflect the changes of angular position of the rotor of the machine. In an autocontrolled electric machine, this signal is used to slave the current in the windings of the stator to the maintaining of an optimum angular deviation (typically in quadrature) between the rotating magnetic field in the stator and the magnetic field engendered between the poles of the rotor.

In the document mentioned hereinabove, the housing of the resolver may be closed by a cover which plugs the central part of the casing end while locking the stator of the resolver against an annular abutment around the passage of the machine shaft in the flange. During mounting, in such an embodiment, the resolver may be mounted in the machine by engaging its rotor on the shaft and its stator in the housing provided for this purpose in the casing until these two elements reach a prescribed axial position inside the machine which is thereafter maintained by closing the cover. Before closing the cover it is appropriate to adjust the angular position of the stator with respect to the rotor in such a way that the output signal of the windings of the resolver takes a value determined in advance when the offset of the rotor and of the stator of the electric machine is at its optimal value. This condition is necessary if one desires to be able to operate the software for driving and slaving the system with the same parameters from one machine to another.

In order to satisfy the abovementioned condition, the resolver rotor which is keyed in a fixed position on the shaft of the machine rotor is introduced into the housing in which the stator has previously been positioned with its connections for electrical linkage with a unit exterior to the machine. The adjustment is performed by rotating the resolver stator in its housing until the output signal reaches the prescribed reference value. At this moment its position is made fast by the radial clamping of a system of three jaws installed at 120° in the housing of the stator, which lock the periphery of the latter.

Other embodiments for mounting a device for angularly adjusting the position of a resolver are for example described in US 2006/226719 of 12 Oct. 2006 which firstly refers to two embodiments of the prior art before describing its subject proper. In the first earlier embodiment, a resolver is mounted axially on the exterior with respect to the interval of the rotation bearings of the motor rotor at the extremity of which the resolver rotor is fixed, in a general manner which resembles the example previously described. In the second embodiment, an angular position detector is embodied with the aid of a stationary Hall-effect sensor past which there travels permanent magnet keyed on the shaft of the motor rotor. The sensor and the magnet are disposed axially between the motor rotor and one of the support bearings of the rotor shaft. The circumferential adjustment of the angular position detector with respect to the motor is performed by rotating the Hall-effect sensor mounting pad with respect to the axis of the motor.

As regards the embodiment which forms the subject proper of US 2006/226719 hereinabove, it comprises a resolver whose stator is mounted axially between the two roller bearings of a motor shaft on which the rotor of the resolver is fixed. The stator of the resolver is inserted inside a sleeve which is attached to a cover which closes an end of the casing of the motor. Wires for connecting the resolver stator pass directly through, in a radial orientation, a space which separates the periphery of the winding of the stator and the exterior envelope of the machine towards an exit orifice fitted with a protection seal. According to an exemplary embodiment, an angular adjustment of the stator of the resolver with respect to the motor may be performed by rotating the support of the resolver stator with respect to the cover as far as the chosen position. The stator is thereafter locked with the aid of three circumferentially distributed clamping members.

In another embodiment described in U.S. Pat. No. 3,267, 399 of 16 Aug. 1966 a stepper motor is described which comprises a toothed wheel keyed on the rotor in magnetic cooperation relationship with two horseshoe magnetic pieces carried by a mounting plate angularly adjustable around the axis of the rotor. Between the arms of each of the magnetic pieces is wound an electrical winding. The adjustment of the angular position of the support plate makes it possible to adjust the angular relationship between the teeth of the wheel which travel past with the rotation of the motor and the magnetic fields produced in the magnetic pieces so as to precisely follow the variation in angular position of the toothed ring of the motor.

Now, whatever system is proposed, it turns out that the technician encounters difficulties in precisely and rapidly adjusting a resolver for the calibration thereof. This adjustment often requires great skill to prevent the axis of the resolver stator from being offset with respect to that of the rotor shaft during the adjustment phase which requires a certain radial play before the locking by the clamping members. Now, despite its tricky nature, it has furthermore to be repeated each time that interventions have to be made in the casing end housing after removal of the extremity closing cover which involve a displacement, even slight, of the resolver stator.

Another very general difficulty is related to the fact that signal output from the resolver is normally performed by conductors issuing or extending from the resolver stator which emerge at the periphery of the latter before being directed towards an opening in the casing so as to be connected up to a signals connector. On mounting, it is therefore necessary to pass these conductors through this opening when the resolver stator is being put in place in the housing provided therefor. A sufficient length of conductors must be provided for this purpose. It must thereafter be possible for it to be "absorbed" while putting the stator in place in a space where they do not impede the other components. This is normally done by providing a sufficient space in the vicinity of the resolver stator to wind up the superfluous length. Now, it turns out that the presence of the mechanism for locking the stator while adjusting its angular position constitutes an obstacle to this arrangement.

Finally, whatever the precision in the preparation and assembling of the components, it remains that the adjustment requires an angular swing of the stator with respect to the exit opening for taking the connection conductors to the outside. This displacement must be able to be absorbed by an excess of length of the conductors with respect to the quantity necessary for a mean adjustment position. The obligation to accommodate this connection slack in the reduced space available inside the housing reserved for the resolver stator represents a substantial difficulty in most current resolver mounting systems.

SUMMARY OF THE INVENTION

Faced with these difficulties the invention is aimed at a device allowing a mounting and a procedure for angularly adjusting a resolver in an electric machine casing that are easier to achieve and to use than in the past.

For this purpose, an embodiment of the invention is a device for mounting a resolver in an electric machine comprising a stator, a rotor on a shaft, mounted for rotation in the stator, and a casing enclosing this assembly, in which the resolver comprises a resolver stator in a housing inside the casing and a resolver rotor driven in rotation by the shaft of the machine rotor inside the resolver stator, characterized in that this mounting device comprises an adjustable member for fixing the angular position of the resolver rotor on the shaft of the machine rotor and a means for clamping between these two members in the chosen angular position for preserving it during operation. The ability to mount the stator in a position fixed in advance greatly facilitates mounting. In contradistinction to what the prior art might have led one to think, the applicant has been able to note that mounting allowing the adjustment of the resolver on the basis of an angular adjustment of the resolver rotor with respect to its axis yielded particularly beneficial results without creating any substantial difficulty of embodiment or of use, as is explained hereinafter.

According to a preferred embodiment, the said mounting device comprises a friction race suitable for immobilizing the resolver rotor by friction on the shaft while permitting their relative rotation by sliding under the action of a sufficient adjustment torque, greatly exceeding the torques exerted during normal operation of the machine. The friction element can advantageously be embodied with the aid of a friction race whose interior is in frictional contact with a male land, at the periphery of the shaft of the machine, and whose exterior is in frictional contact with a female land inside the body of the said resolver rotor.

Both in its most general aspect and also in the preferred embodiment which has just been defined, the mounting device according to the invention makes it possible to avoid numerous difficulties encountered in the prior art, particularly in the quasi general case where the connections between the resolver stator and the control unit which manages the operation of the machine are effected by flexible conductors. It has indeed been seen that the members for adjusting and fixing the angular position of the stator may indeed interfere with these connections. Moreover, for the requirements of the adjustment proper, it is necessary to leave sufficient "slack" in the strands of these conductors which link the windings of the stator with the exterior of the machine to permit the rotation of the stator in either direction according to the needs of the adjustment. It is thereafter necessary to be able to manage the housing of the excesses of variable length of these strands during the fixing of the stator and then when closing the housing of the assembly in the casing.

These difficulties are completely solved with the system for fixed mounting of the stator made possible by the invention. The resolver stator may be wired in advance with predetermined lengths of cables and ready to be put in place without trial and error during mounting. Now, the applicant has been able to note that the need to carry out, on the other hand, the adjustment with a rotary mounting of the rotor on the rotor carrier shaft before clamping these two members together did not include the apparently deterring difficulties that consultation of the prior art might lead one to expect. In fact the accessibility to the resolver rotor and its angular adjustment may be effected for example by providing a hookup member at the end of this rotor for a tool making it possible to rotate it with respect to the rotor carrier shaft and a clamping unit for binding the shaft and the rotor in the angular position adopted.

A preferred form, mentioned above, for achieving this angular adjustment of the resolver rotor relies on another surprising a priori finding. In this embodiment, the mounting of the rotor on the rotor carrier shaft is achieved with the aid of a friction bearing which makes it possible to ensure at one and the same time the angular adjustment and the clamping of these two members. One might have expected such a mounting to be incompatible with the necessary objectives of solidity and endurance of the adjustment. It is indeed known that in an electric machine the rotor is subjected to torque variations which may be considerable and fierce. It is of the utmost importance therefore that the fixings and adjustments used are resistant to the loadings resulting from these variations in running conditions, especially in applications to high-power compact electric machines and, what is more, able to be deployed over long periods in safety functions in motor vehicles. Experience has shown that such was the case. It is not indispensable to provide a member for clamping the rotor on the rotor carrier shaft which is independent of the friction bearing allowing the necessary angular adjustment.

According to an advantageous form for the implementation of the device for fixing the resolver rotor in accordance with the previous paragraph, the latter comprises a hookup member allowing the rotational driving with respect to the shaft of the machine rotor so as to vary its angular position on the shaft after the installation of the resolver in the machine, for example with a coupling tool provided for this purpose, making it possible to rotate it with respect to the machine rotor shaft during an adjustment procedure. This hookup member may simply comprise on the side of the resolver rotor a relief element which allows a tool to grip or to couple with the external axial end face of the resolver rotor so as to apply a rotation torque to it. The relief element can for example consist of one or preferably at least two blind holes in the said face of the resolver rotor. A tool furnished with two pins corresponding to the said blind holes can then be used to rotate it on the machine shaft. Thus, in an industrial adjustment, before the closing of the housing of the resolver at the end of the casing, the pins are introduced into these blind holes and the tool is driven in rotation, manually or automatically, while the shaft of the machine rotor is immobilized.

Concerning the resolver stator in the mounting according to the invention, it preferably possesses an internal axial face suitable for coming to bear against a shoulder centred on the axis of rotation of the machine in the said casing housing. It may be normally overlaid against this shoulder by the cover for closing the said end housing of the casing.

According to a beneficial particular embodiment, the shaft of the machine rotor enters the housing of the resolver stator in the casing through an axial bore whose diameter is sufficient to allow the passage of the resolver rotor out of the stator of the resolver stator and out of the said housing when the shaft of the machine rotor is withdrawn out of the stator of the machine from its end axially opposite from the housing of the resolver.

Thus the invention makes it possible to effect a resolver mounting in which, during assembly, the elements of the rotor and of the stator of the machine are installed in the casing and the rotor shaft mounted in the bearings provided for this purpose. Next, the resolver rotor may be mounted on the shaft of the machine by sliding it axially on the particular fixing device provided by friction from the end of the said shaft in the housing of the resolver up to its operational position. The resolver stator can thereafter be mounted around the rotor in its housing provided for this purpose. The angular setting of the resolver rotor with respect to its stator may be performed from this same end of the shaft, before housing at the end of the casing is reclosed. It is noted that once this adjustment has been performed, if an intervention requires access to the shaft of the machine, necessitating for example the withdrawal of the whole of the machine rotor from its stator, this withdrawal may be done without dismounting the resolver rotor from its position on the shaft and consequently without needing to redo the adjustment of the resolver for this reason alone on remounting the shaft.

Other characteristics and advantages of the invention emerge from the description given hereinafter with reference to the appended drawings which show, by way of nonlimiting examples, embodiments of the subject of the invention.

DESCRIPTION OF EXEMPLARY EMBODIMENTS OF THE INVENTION

Figure 1:
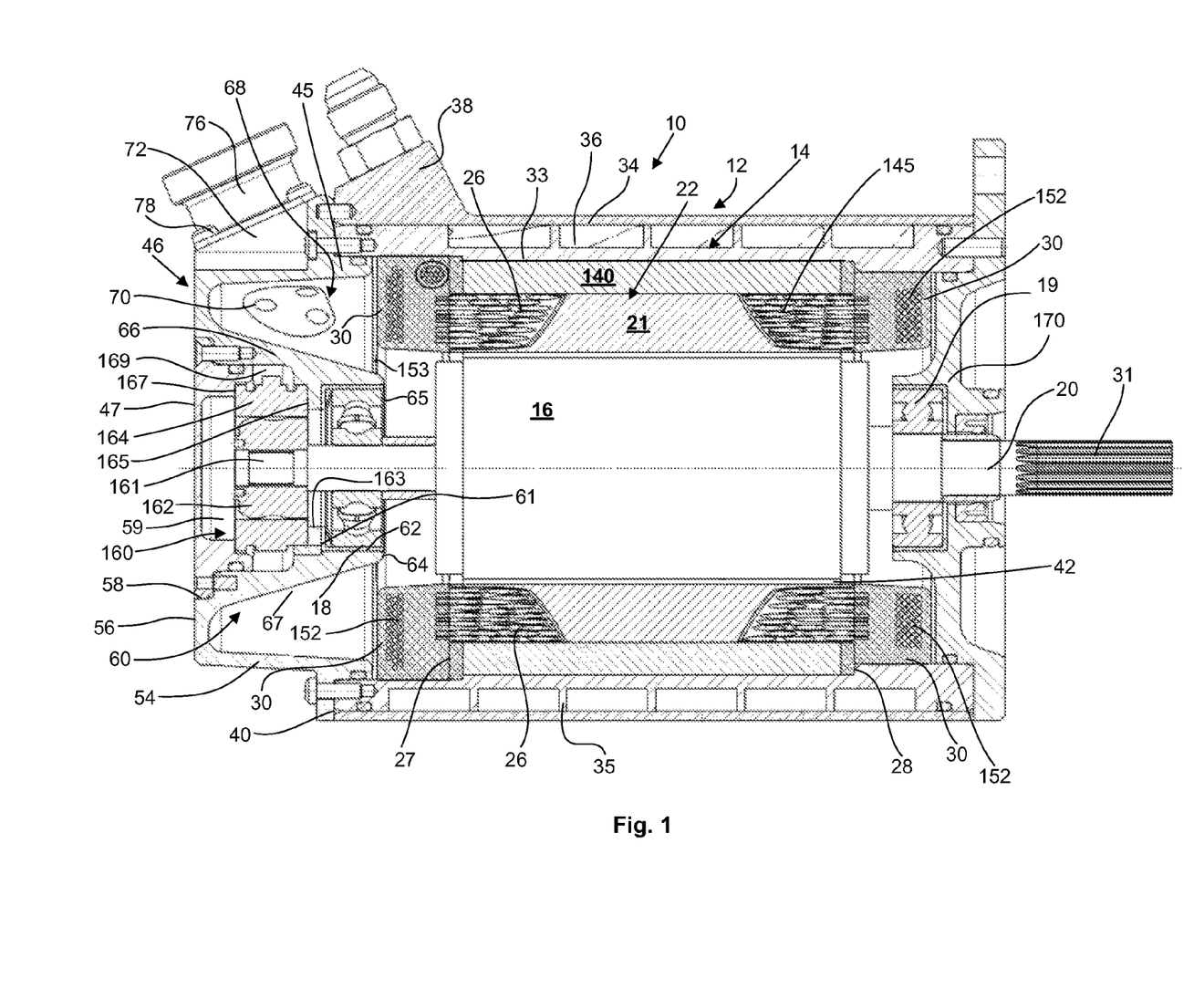
FIG. 1 represents a longitudinal sectional view of an electric machine according to an embodiment of the invention.

A synchronous electric machine 10 represented in FIG. 1 comprises an external casing 12 inside which are housed a stator 14 and a rotor 16 mounted for rotation with respect to the stator around an axis 20 inside the stator. The rotor is mounted on a shaft 31 engaged in roller bearings 18 and 19 secured to the casing 12. The stator 14 comprises a magnetic circuit 22 which comprises a first generally cylindrical stack 21 of magnetic laminations. The stack 21 is hollowed out with a series of peripheral notches 26 which, without being parallel to the axis 20, run between one of its axial end faces 27 and its other axial end face 28, while remaining circumscribed inside a virtual cylindrical ring.

A yoke 140 consisting of a cylindrical stack of laminations in the form of circular rings surrounds the stack 21 and closes the radially external ends of the notches 26, so ensuring the continuity of the magnetic circuit 22. In the notches 26 are housed, in a well-known manner, copper conductors 145, folded back on exit from each notch, forming a loop so as to enter another notch 26. They thus produce three windings or coils suitable for being connected electrically in a star to a power supply source or to a three-phase A.C. electric current-using device, according to a well-known mounting for this type of machine. The sets of loops of the winding conductors 145 exiting the terminal faces 27 and 28 form "winding heads" 152 impregnated with resin in terminal blocks 30 (FIG. 1).

The magnetic circuit 22 is drilled axially with a cylindrical channel intended to receive with a calibrated air gap 42 the rotor 16, composed of an assemblage of permanent magnets, that are not represented, and mounted on the shaft 31 whose ends are each engaged in one of the two bearings 18 and 19 spaced axially apart on either side of the stator.

Figure 3:
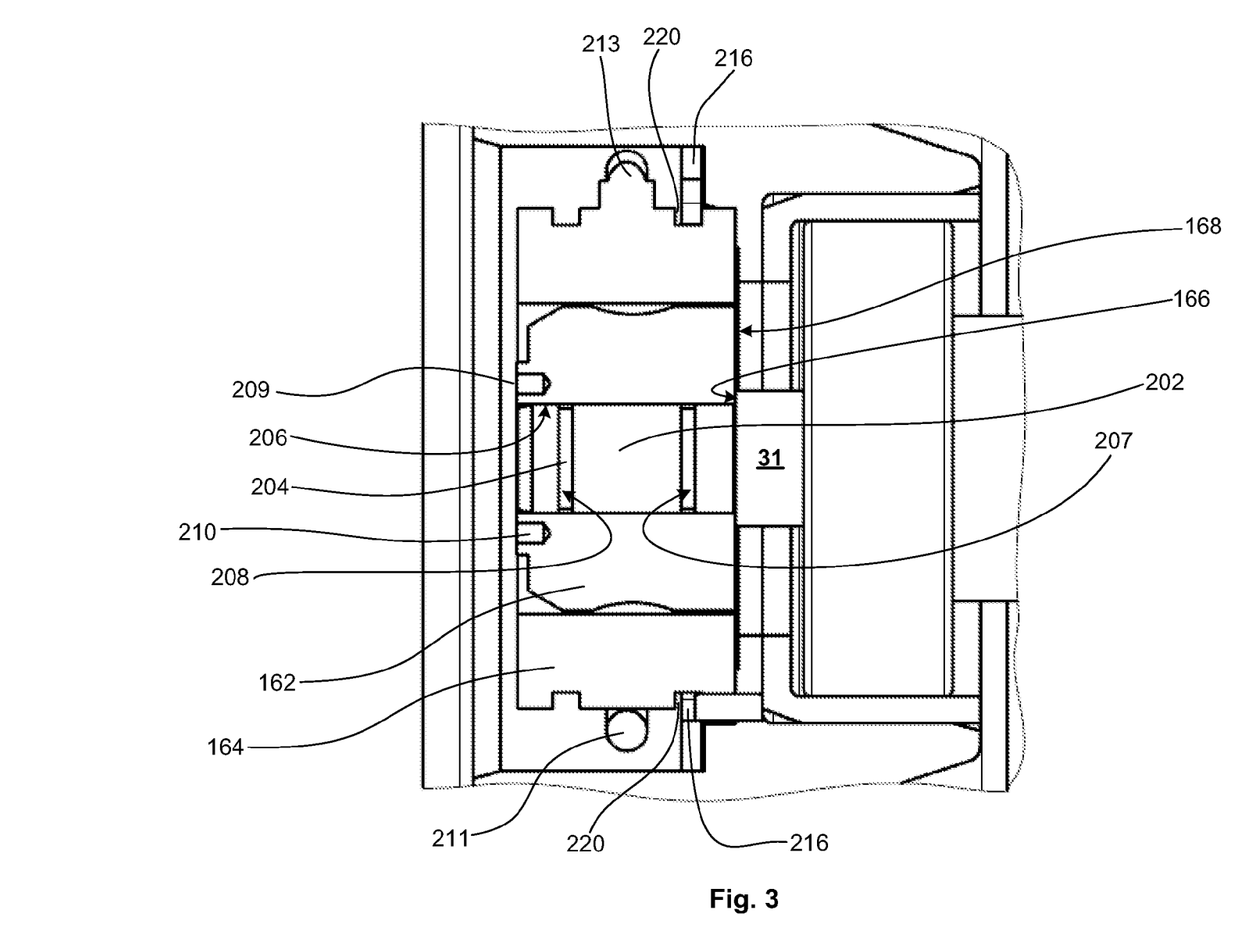
FIG. 3 is a magnified view of a section through the resolver of FIG. 2.

The stator 12 is housed in a portion of the casing forming a quill or sheath in two co-axial parts. In the internal cylindrical space delimited by the relatively thick wall of a sleeve 33 constituting the internal part of the quill is mounted and locked in rotation the yoke 140 of the magnetic circuit 22. The external radial face of the wall of the sleeve 33 is fitted with helix-like ribs 35 which together delimit three walls of a fluid circulation channel 36 for cooling the stator body. The fourth face of the channel 36 is closed by an external sleeve or bushing 34, fitted around the sleeve 33 (FIG. 3). On the side of one of its ends, the bushing 34 exhibits an opening surmounted by a hollow nozzle 38 whose internal channel is linked through the said opening to a fluid inlet into the cooling channel 36 made between the two sleeves 33 and 34 so as to form a double-helix serpentine at its external cylindrical surface. The sleeve 34 is provided with a second nozzle, not visible on the drawing, linked in an analogous manner to another end of the channel 36 for the discharging of the cooling fluid.

The windings of the magnetic circuit 22 comprise connection conductors, not visible in the figure, which exit from the notches 26 at an end, situated on the left in FIG. 1 in this example, of the magnetic circuit 22 so as to be connected up outside the machine as is explained further on. On this same side the quill formed by the assemblage of the sleeves 33 and 34 terminates axially with an annular face 40 perpendicular to the axis 20 in an axial position in the vicinity of that of the ends of the resin blocks 30.

In FIG. 1, the annular end face 40 of this quill appears as formed by the relatively thick end face of the internal sleeve 33 surmounted radially outwardly by the axial end of the external sleeve 34. It is slightly offset axially outwardly with respect to the endmost extremity of the resin block 30 in which the winding heads 152 are embedded. This offset allows the terminal cylindrical lip 45 of a hollow cowl 46, intended to supplement the casing of the machine on this side, to nest inside the terminal wall of the sleeve 33.

The lip 45 of the cowl 46 is surmounted by a collar 50 which marks the limit of the travel for nesting the lip 45 in the sleeve 33. It is furnished with drillings for screws 52 for axial fixing of the cowl in the terminal face 40 of the quill. On the side opposite from the lip 45 the cowl 46 exhibits a cylindrical wall 54 which connects the collar 50 to an axial end of the cowl, which possesses a face 56 forming a circular ring around an axial opening 59 normally closed by a removable cover 47 perpendicular to the axis 20. From the internal radial edge 58 of the face 54, the wall of the hollow cowl 46 continues with an axial return towards the interior of the machine which forms a flange element 60 of generally frustoconical form. The wall of this flange element 60 defines at its other axial end a cylindrical land 62 in which the roller bearing 18 of the rotor shaft 31 is housed in abutment against an annular shoulder 61. A bore 163 allows the passage of the rotor shaft 31 on the other side of the flange element 60. In the assembled position represented in this example in FIG. 1, the internal axial faces 64, of the piece 60, and 65, of the bearing 18 that it supports, are situated substantially in the same plane normal to the axis 20 as the terminal parts of the resin blocks 30 enveloping the winding heads 152. An annular space 153 between the internal axial end of the flange element 60 and the resin blocks 30 allows the free passage of the connection wires of the coils of the magnetic circuit 22 in an annular space 68 inside the cowl 46, in a shape that flares out axially and radially towards the interior, from the exit of the notches as far as an exit opening 70 made in the cowl 46.

The wall 66 of the flange element 60 which links its terminal face 56 to the land 62 exhibits a frustoconical external radial face which limits, with the internal radial face of the cylindrical wall 54 of the cowl, an axisymmetric housing flared axially towards the interior of the machine. At the periphery of this space the wall 54 is drilled with two openings one of which, 70, is clearly visible in FIG. 1. On the external side of the wall 54 is fixed a nozzle 72 drilled with an internal channel, not visible, extending the opening 70. The nozzle 72 is surmounted by an electrical connector 76 held by screws 78 on the exit face of the channel away from the nozzle 72.

Figure 4:
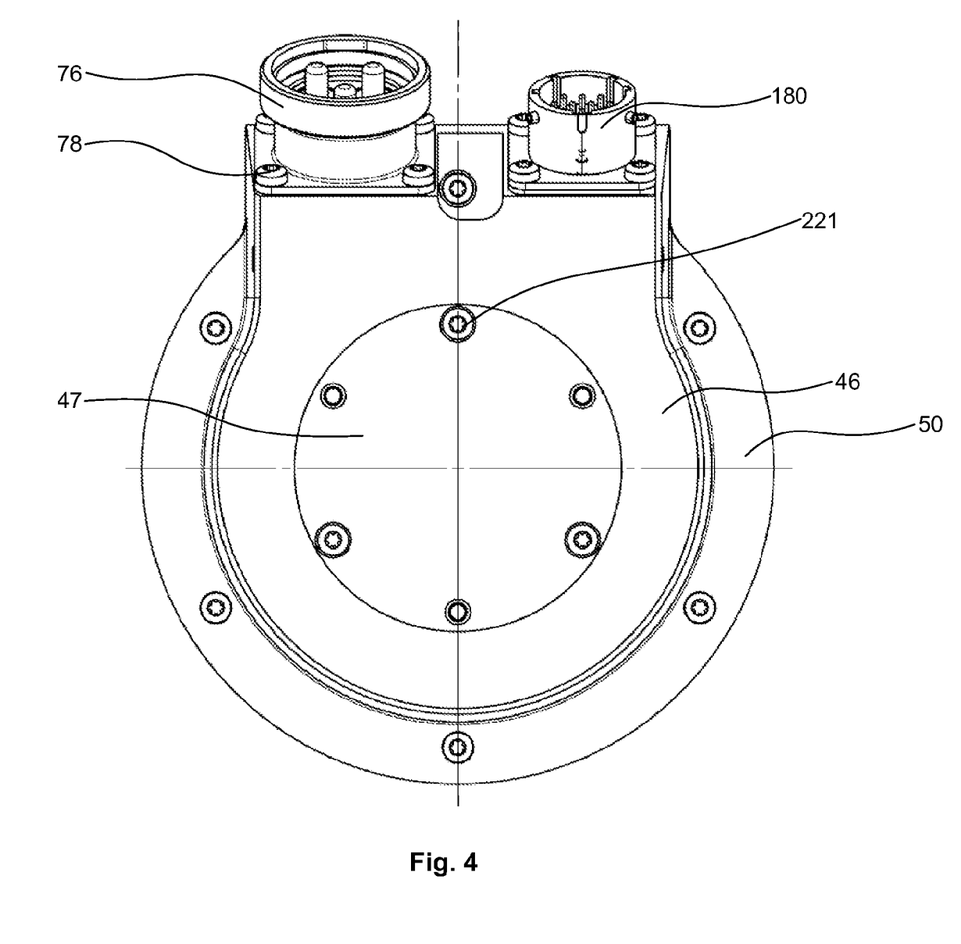
FIG. 4 is a left view of an end cowl of a machine inside which a resolver is housed.

Returning now to the flange element 60, its internal radial wall defines a housing whose shape is globally flared towards the external axial end of the cowl 46, which emerges into the central opening 59 of the latter. In this housing is mounted a resolver 160 comprising a rotor 162 fixed at the end 161 of the shaft 31 of the rotor, on the side of the roller bearing 18 opposite from the rotor proper, and a stator 164. The resolver stator 164 is locked between a shoulder 165, around the bore 163 in the piece 60, and a shoulder 167, in the internal axial face of the cover 47 whose central part exhibits a recess as represented. The cover 47 is held by screws 221 at the end of the cowl 46 (FIG. 4). A peg 218 (FIG. 2) effects a rotational locking, by construction, of the stator and of the frustoconical wall 66 of the flange element 60. Thus the resolver stator 167 is locked both in rotation and in the axial sense in the casing of the machine.

The rotor of the resolver 160 is keyed onto the shaft 31 of the rotor 16 in a predetermined, adjustable, angular position which serves as reference to transmit, at each instant, an item of information to the system for controlling the electric machine regarding the angular position of the rotor of this machine in its stator, in accordance with the known operating principle of the autocontrolled three-phase synchronous machines.

The machine shaft 31 comprises at its end 161 a shoulder 166 turned towards the exterior against which is applied a lateral face 168 of the resolver rotor 162. Between this shoulder and the end of the shaft 31 is made a male land 204 inside which is housed a, for example sprung, friction race 202. The race comprises a cambered or puckered interior face which embraces the bottom of the male land 204 while allowing a relative sliding in rotation if the torque applied is sufficiently high. The axial ends of this friction race 202 are retained axially by the edges 207 and 208 of the male land 204. The resolver rotor 162 is drilled with a central bore defining a female land 206 which is engaged on the shaft extremity 31 around the friction race 202. The generally cylindrical cambered or puckered exterior face of the friction race 202 exerts a frictional torque on the rotor for 162 sufficing to prevent it from rotating with respect to the shaft 31 during normal operation. However the combined frictional loadings of the two coaxial faces, internal and external, of the friction race 202 may be surmounted for the requirements of the adjustment by exerting a sufficient differential torque between these two pieces, for example with the aid of a tool specially provided for this purpose. In this regard, the terminal face of the stator is furnished with two small blind holes 209 and 210 forming a hookup means by virtue of which a tool, not represented, comprising two pins suitable for engaging in the two blind holes may be coupled with the rotor so as to manoeuvre it in rotation for the purposes of adjusting the orientation of the resolver rotor with respect to the shaft of the machine 31 as will be explained further on.

It is noted that the disposition described here makes it possible to perform certain interventions such as maintenance operations, for example by dismantling the shaft 31 starting from the right part of FIG. 1 where the machine is closed by a flange 170 screwed onto the other terminal face of the casing quill 33, 34, which supports the second roller bearing 19 for the other end of the shaft 31. The dismantling of the flange makes it possible to release the right part of the shaft 31. The rotor can then be extracted from the stator, taking with it, at the other end of the shaft 31, not only the roller bearing 18 which is extracted from the corresponding land 62 of the flange element 60, but also the rotor 162 of the resolver through the bore 163 whose diameter is greater than that of the resolver rotor. It is interesting to note that the operation can be done without destroying the angular setting existing between the two rotors. This makes it possible to gain valuable adjustment time on remounting.

Figure 2:
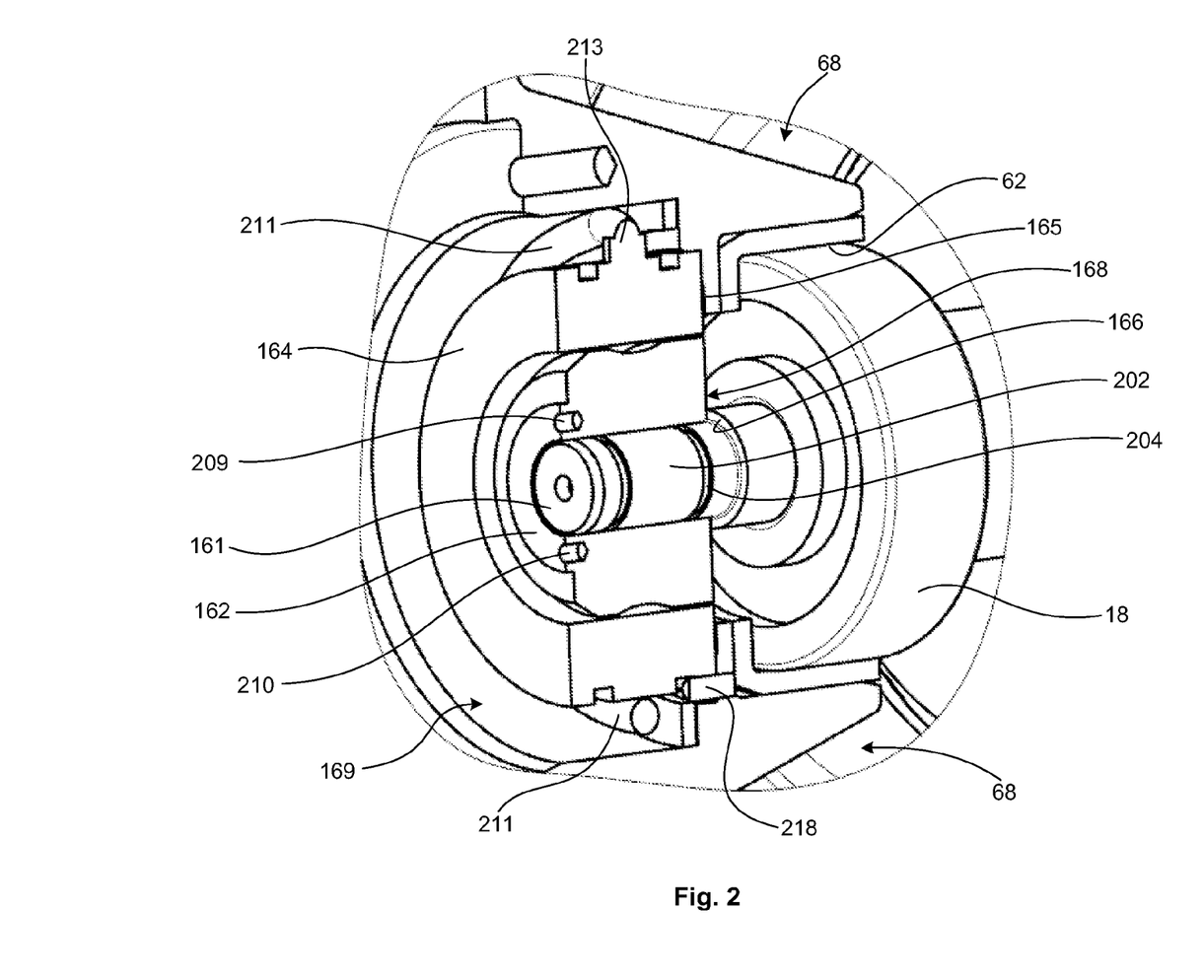
FIG. 2 is a perspective view of a resolver in a cut-away view of a portion of the machine of FIG. 1.
Figure 5:
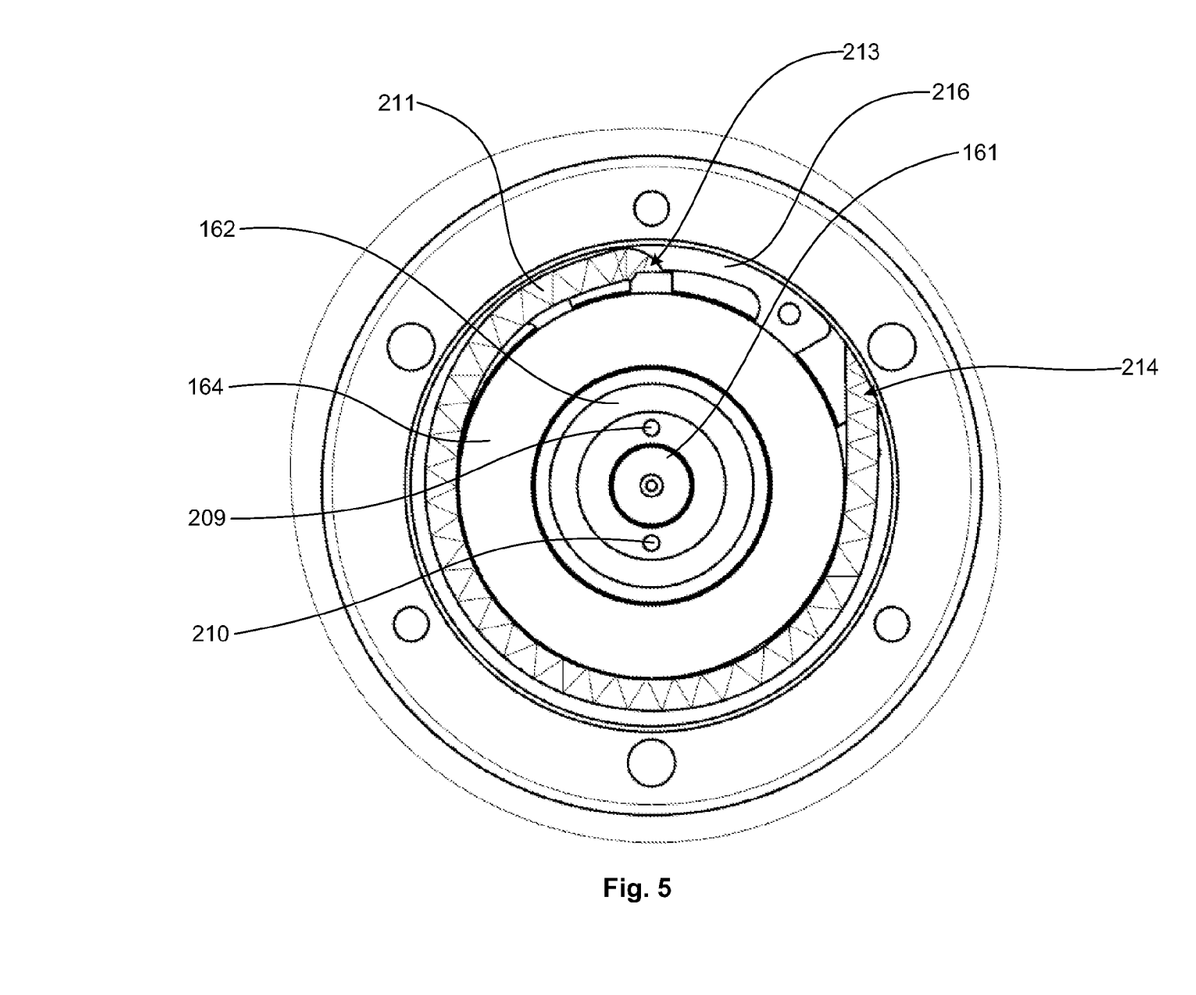
FIG. 5 is a left view from an end of the resolver after removing the end cowl of FIG. 4.

In FIG. 1 and FIGS. 2 and 3, it may be noted that the apex of the resolver stator 164 is surmounted by an annular space 169 in the internal radial wall of the flange element 60 between the two shoulders 165 and 167 which hold it in position. It is seen in FIG. 2 that this annular space 169 is obstacle free over the whole of the periphery of the resolver stator. It forms an annular housing which makes it possible to receive without impediment the bundle of linking conductors 211 of the coils of the resolver stator, which are clearly visible in FIG. 5, which carry the information useful for controlling as just alluded to. The bundle of conductors 211 originating from the windings of the resolver stator enters the said annular space 169 at a point 213. It traverses an arc in this space 169 up to a point 214 where it crosses the wall 66 of the flange element 60 by heading in the interval 68 towards an opening (not visible) made in the lateral wall 54 of the cowl 46 at an azimuth close to that of the opening 70 (FIG. 1). Like the opening 70, this second opening is surmounted by a nozzle, fixed to the exterior body of the cowl 46. The conductors passing through the said opening traverse a channel, not visible, in the said nozzle as far as a signals connector 180 (see FIG. 4).

On mounting, when the elements of the stator of the machine have been put in place in the casing and an impregnation of resin has made it possible to consolidate and to insulate the assembly, the rotor on its shaft 31 is threaded into its housing inside the stator. The linking conductors of the stator of the machine are passed through the opening 70 of the cowl. The bearing 18 and the cowl 46 may then be installed around the rotor shaft 31, the bearing 18 sitting in the land 62 of the flange element 60. The end 161 of the shaft 31 of the machine rotor projects inside the central space still open in the cowl 46, space delimited radially by the internal radial wall of the flange element 60. The rotor 162 of the resolver 160 is then installed by forcing the bore (female land 206) of the rotor 162 around the friction race 202 until the face 168 comes into abutment against the shoulder 166.

The stator 164 is thereafter installed in its housing against the shoulder 165 of the flange element with the rotational locking peg 218. At this juncture a device for provisional positioning of the stator is installed in the form of a circlip 216 (FIGS. 3 and 5) whose internal radial edge is inserted into a groove 220 at the periphery of the stator and ensures its axial setting by leaving it a slight radial play with respect to the external diameter of the bottom the groove 220. The external diameter of the circlip 216 is just greater than that of the internal cylindrical space 169 ensuring the housing of the said stator in the wall 66 of the flange 60.

On mounting, the stator with its bundle of wound conductors 211 is inserted around the rotor 162 inside the annular space 169 with a slight diametral compression of the circlip which, by relaxing against the cylindrical wall of this space 169, ensures an axial setting with gentle friction of the stator assembly. As shown clearly by FIGS. 2 and 3, the groove 218 is situated on the internal axial side of the periphery of the stator in such a way that the circlip is clamped axially at the bottom of the space 169 while leaving the axially external part of this space free so as to receive the bundle of conductors 211. In this position the stator may be readily manipulated in rotation or even slid axially during the operation of connecting the conductors 211 up to the exterior of the machine, through firstly the opening, not represented, in the wall 66, to the internal space 68, and then the opening in the lateral wall 54 of the cowl 46 to the connector 180.

Before completely closing the cowl 46 by putting the cover 47 in place and completely locking the resolver, the latter is then adjusted so as to select an angular position of the resolver rotor 162 which corresponds to a position of the magnetic poles of the rotor and of the stator that is determined by a set of tests. The adjustment of the angle of the resolver rotor is performed with a tool possessing two pins suitable for engaging in the blind holes 209 and 210 in such a way that it is possible to force the rotor 162 to rotate by sliding with respect to the shaft 31, against the retaining frictional forces exerted by the friction race 202, as far as a position which it will thereafter be possible to preserve throughout the duration of use without dismantling the machine.

The invention is not limited to the examples and embodiments described and represented hereinabove; various modifications may be afforded thereto without departing from the scope thereof defined by the appended claims.

The invention claimed is:

1. A device for mounting a resolver in an electric machine, the electric machine including:
    a machine stator,
    a machine rotor having a shaft and arranged to rotate inside the machine stator, and
    a casing enclosing an assembly of the machine stator and the machine rotor,
the resolver including:
    a resolver stator positioned in a housing inside the casing, and
    a resolver rotor that rotates with the shaft of the machine rotor inside the resolver stator,
the device comprising:
    an adjustable connector that adjustably sets an angular position of the resolver rotor on the shaft of the machine rotor and clamps the resolver rotor to the shaft of the machine rotor to preserve a set angular position during operation.

2. A device for mounting a resolver in an electric machine according to claim 1, wherein the adjustable connector includes a friction race having an interior portion that is in frictional contact with a male land at a periphery of the shaft of the machine rotor and having an exterior portion that is in frictional contact with a female land inside the resolver rotor.

3. A device for mounting a resolver in an electric machine according to claim 1,
    wherein the shaft of the machine rotor is mounted for rotation using a bearing supported by a flange that is attached to the casing, and
    wherein the resolver rotor is mounted on a portion of the shaft of the machine rotor that emerges from the bearing on a side opposite from the machine rotor.

4. A device for mounting a resolver in an electric machine according to claim 3,
    wherein the flange is attached to the casing towards an external axial end of the casing on a side corresponding to the resolver,
    wherein the flange includes a wall, which projects axially towards an interior portion of the casing from an attachment portion as far as a terminal part of the wall, which carries the bearing of the shaft of the machine rotor, and
    wherein a space enveloped by a radially internal face of the flange forms the housing for the resolver stator in the casing, the space being configured to widen between the terminal part and the external axial end of the casing.

5. A device for mounting a resolver in an electric machine according to claim 4, wherein
    a wall of the casing includes an opening for an electrical connector of the resolver to make an external connection, and
    the resolver stator is linked to the opening in the wall of the casing by conductors extending from the resolver stator through a passage in the wall of the flange.

6. A device for mounting a resolver in an electric machine according to claim 5, wherein
    the resolver stator is coiled,
    the conductors extend from coils of the resolver stator, and
    portions of the conductors are housed in an at least partially annular space in an internal radial wall of the flange around the resolver stator while other portions of the conductors extend through the passage in the wall of the flange towards the opening in the wall of the casing.

7. A device for mounting a resolver in an electric machine according to claim 5, wherein the resolver stator includes a friction element arranged to enable, on mounting, a provisional holding of the resolver stator in an axial position in the housing, after the conductors extending from the resolver stator have passed through the opening in the wall of the casing to make an external connection and before a definitive locking of the resolver stator in the set angular position during operation.

8. A device for mounting a resolver in an electric machine according to claim 7, wherein the friction element is a circlip mounted in an exterior groove of the resolver stator, the friction element having a periphery located in a position of frictional contact in a circular groove cut around the housing of the resolver stator and able to receive the conductors extending from the resolver stator before passage of the conductors to the opening of the wall of the casing to make an external connection.

9. A device for mounting a resolver in an electric machine according to claim 1, wherein
   the resolver stator includes a face that abuts in an internal axial direction against an abutment oriented axially outwards and centered on an axis of the shaft of the machine rotor in the flange, and
   the face is held against the abutment in an operational position in the casing by a lock.

10. A device for mounting a resolver in an electric machine according to claim 9, wherein
    the abutment is formed in an at least partially annular face, of external axial orientation, of the flange around an opening at an emergence portion of an axial passage, through which passes a part of the shaft of the machine rotor, which links the machine rotor on an internal axial side of the flange to the resolver rotor on an external axial side of the flange, and
    wherein a transverse dimension of the axial passage is sufficient to allow an exit of the resolver rotor out of the resolver stator and through the axial passage, when the machine rotor is withdrawn axially out of the machine stator from an end axially opposite from the resolver.

11. A device for mounting a resolver in an electric machine according to claim 1,
    wherein the shaft of the machine rotor is rotatably mounted on a bearing supported by a flange that is attached to the casing of the electric machine,
    wherein the resolver rotor is mounted on a portion of the shaft that emerges from the bearing on a side opposite the machine rotor, and
    wherein the adjustable connector for adjustably setting the angular position of the resolver rotor includes a driver arranged to rotationally drive the resolver rotor with respect to the shaft of the machine rotor so as to adjust the angular position of the resolver rotor on the shaft.

12. A device for mounting a resolver in an electric machine according to claim 11,
    wherein the driver includes an access to an axially external lateral face of the resolver rotor, and
    wherein the axially external lateral face includes a hookup for coupling with an external tool introduced through the access so as to rotate the resolver rotor on the shaft of the machine rotor in an immobilized state during an adjustment procedure.

* * * * *